US012345407B2

(12) United States Patent
Li et al.

(10) Patent No.: US 12,345,407 B2
(45) Date of Patent: Jul. 1, 2025

(54) LIGHTING APPARATUS

(71) Applicant: LEEDARSON LIGHTING CO., LTD., Fujian (CN)

(72) Inventors: Peng Li, Fujian (CN); Zhihua Wang, Fujian (CN); Ping Yan, Fujian (CN); Linhua Wang, Fujian (CN)

(73) Assignee: LEEDARSON LIGHTING CO., LTD., Fujian (CN)

(*) Notice: Subject to any disclaimer, the term of this patent is extended or adjusted under 35 U.S.C. 154(b) by 0 days.

(21) Appl. No.: 18/217,999

(22) Filed: Jul. 3, 2023

(65) Prior Publication Data

US 2025/0012423 A1 Jan. 9, 2025

(51) Int. Cl.

*F21V 5/00* (2018.01)
*F21V 17/10* (2006.01)
*F21Y 115/10* (2016.01)

(52) U.S. Cl.

CPC ............ *F21V 5/007* (2013.01); *F21V 17/101* (2013.01); *F21Y 2115/10* (2016.08)

(58) Field of Classification Search

CPC .... F21V 5/007; F21V 17/101; F21Y 2115/10; H01L 33/58; H01L 2924/12041
See application file for complete search history.

(56) References Cited

U.S. PATENT DOCUMENTS 7,066,626 B2 * 6/2006 Omata ............... H10H 20/8506 362/257
8,267,552 B2 * 9/2012 Hu ........................ F21V 29/773 362/311.06
8,282,250 B1 * 10/2012 Dassanayake ............ F21V 3/00 362/249.02
8,708,526 B2 * 4/2014 Wu ......................... F21V 21/00 362/249.02
10,186,643 B2 * 1/2019 Kang ................. G02B 19/0028
11,215,347 B2 * 1/2022 Xie ........................... F21K 9/00
11,268,661 B2 * 3/2022 Chen ..................... F21V 23/009
11,555,596 B2 * 1/2023 Tsunetomo .............. G02B 5/02
11,894,499 B2 * 2/2024 Wilcox ................... H01L 33/58
2010/0096967 A1 * 4/2010 Marinus .................... F04F 7/00 313/46
2016/0298824 A1 * 10/2016 Holland ............... H05B 45/325
2023/0207754 A1 * 6/2023 Lin ......................... H01L 33/58 257/98

* cited by examiner

*Primary Examiner* — Matthew J. Peerce
(74) *Attorney, Agent, or Firm* — Chun-Ming Shih; LANWAY IPR SERVICES

(57) ABSTRACT

A lighting apparatus includes a light source plate, multiple LED chips, a driver module and multiple lens units. Multiple LED chips are mounted on the light source plate. The driver module is surrounded by the multiple LED chips. Each lens unit has an interior space for enclosing one corresponding LED chip. A bottom ratio between a horizontal dimension of the LED chip and a bottom area of the interior space is between 60% to 80%.

17 Claims, 10 Drawing Sheets

LIGHTING APPARATUS

FIELD

The present invention is related to a lighting apparatus, and more particularly related to a lighting apparatus with light path adjustment design.

BACKGROUND

LED (Light-Emitting Diode) light devices have gained significant popularity due to their energy efficiency, longevity, and versatility. There are various types of LED light devices available, each offering unique advantages for different applications.

LED bulbs are designed to replace traditional incandescent or compact fluorescent bulbs in standard light fixtures. One of the primary advantages of LED bulbs is their energy efficiency. They consume significantly less energy than traditional bulbs, resulting in lower electricity bills. LED bulbs also have a long lifespan, reducing the need for frequent replacements. Unlike incandescent or fluorescent bulbs, LED bulbs provide full brightness instantly without any warm-up time. Additionally, many LED bulbs are compatible with dimmer switches, allowing you to adjust the brightness as desired. LED bulbs are also environmentally friendly as they do not contain harmful substances like mercury and are recyclable.

LED light strips consist of multiple small LED chips mounted on a flexible circuit board. They are commonly used for decorative or accent lighting purposes. LED strips offer flexibility in installation as they can be bent, twisted, and cut to fit various shapes and sizes. They are also available in various colors, including RGB (Red, Green, Blue) options, allowing for dynamic and customizable lighting effects. LED strips are energy-efficient, consuming less energy compared to traditional lighting options for similar levels of brightness. They have a long operational life, making them suitable for applications where constant replacement would be inconvenient. Installation is easy, as many LED strips come with adhesive backing for simple attachment to different surfaces.

LED spotlights are directional light sources commonly used for focused illumination in both residential and commercial settings. One of the advantages of LED spotlights is their energy efficiency. They convert a high percentage of electrical energy into light, minimizing wastage. LED spotlights offer precise beam control, allowing you to direct light exactly where it's needed. They also have a long lifespan, reducing maintenance and replacement costs. Compared to traditional halogen spotlights, LEDs produce less heat, reducing the risk of fire and making them safer to handle. Furthermore, LED spotlights provide immediate illumination without any warm-up time.

LED panels consist of an array of small LED chips embedded in a flat panel. They are commonly used for general lighting in offices, schools, hospitals, and other commercial spaces. LED panels are energy-efficient, consuming less energy compared to traditional fluorescent or incandescent fixtures, resulting in lower electricity costs. They provide even and uniform lighting across the entire surface, minimizing shadows and glare. LED panels have a slim design, making them easy to install and suitable for spaces with limited ceiling height. They also have a long lifespan, reducing maintenance requirements.

In summary, LED light devices offer a range of advantages across different types. From LED bulbs for energy efficiency and longevity, LED strips for versatility and decorative lighting, LED spotlights for directional illumination, to LED panels for uniform lighting in commercial settings, these devices have revolutionized the lighting industry with their efficiency, longevity, and flexibility. It is important to make light device design simple while adding flexibility.

LED light technology has seen significant advancements, but there are still technical challenges that designers are working to improve. One crucial area is heat dissipation. LEDs generate heat during operation, and if not effectively managed, it can affect performance and lifespan. To address this, designers are implementing heat sinks and thermal management materials to maintain optimal operating temperatures and ensure the longevity of LEDs.

Another technical problem being addressed is color consistency. Achieving uniform color temperature and color rendering across different LED light devices can be challenging. Variations in LED manufacturing processes, binning, and phosphor coatings can lead to color inconsistencies. Designers are continuously improving color control methods and developing better binning techniques to enhance color uniformity and accuracy.

Flickering and dimming compatibility are also areas of focus. Some LED light devices may exhibit flickering or compatibility issues when used with certain dimmer switches. This problem arises from the interaction between the LED driver circuitry and the dimming technology. Designers are actively working on developing LED drivers that are compatible with a wider range of dimmer switches, ensuring smooth and flicker-free dimming capabilities.

Moreover, light quality and spectral distribution are important factors. While LEDs offer high energy efficiency, the spectral distribution of their light output can sometimes be suboptimal. Designers are researching and implementing advanced phosphor materials and optimizing LED chip designs to improve the spectral performance and color rendering properties of LED light devices.

Additionally, there is ongoing research to address issues such as light flicker at low frequencies, as it can cause discomfort and eye strain for some individuals. By improving the LED driver circuits and implementing advanced modulation techniques, designers aim to minimize or eliminate visible flickering, providing a more comfortable lighting experience.

In summary, while LED light technology has made great strides, there are technical challenges that designers are actively working to overcome. These include improving heat dissipation, achieving color consistency, addressing flickering and dimming compatibility issues, enhancing light quality and spectral distribution, and reducing flicker at low frequencies. By tackling these challenges, the performance, reliability, and overall user experience of LED light devices can be further improved.

In addition to illumination, it is also important to provide a light pattern that meets different needs.

Therefore, it is beneficial to design a light device with useful light path adjustment.

SUMMARY

In some embodiments, a lighting apparatus includes a light source plate, multiple LED chips, a driver module and multiple lens units.

Multiple LED chips are mounted on the light source plate.

The driver module is surrounded by the multiple LED chips.

Each lens unit has an interior space for enclosing one corresponding LED chip.

A bottom ratio between a horizontal dimension of the LED chip and a bottom area of the interior space is between 60% to 80%.

In some embodiments, the light source plate has a central opening surrounding the driver module, a portion of the driver module is above the central opening, and another portion of the driver module is below the central opening.

In some embodiments, an air passage of the light source plate corresponding to the LED chip is disposed aside the LED chip.

A top opening of the air passage is within the interior space.

In some embodiments, the lens unit is attached to the light source plate with a buffer glue that deforms within a predetermined range under thermal expansion.

In some embodiments, there is a tilt angle between a bottom peripheral edge of the interior space and the light source plate.

The tilt angle is between 70 to 80 degrees.

In some embodiments, there is a smooth concave on a top of an exterior surface of the lens unit.

In some embodiments, the lens units are coupled together with a plastic plate.

A top surface of the LED chip is below a top surface of the plastic plate.

In some embodiments, there are micro particles in the lens unit.

In some embodiments, there are concentric circle convex-concave structures on a top of an exterior surface of the lens unit.

In some embodiments, the interior space of the lens unit has a vertical lateral wall and a dome top.

In some embodiments, the interior space of the lens unit has a vertical lateral wall and a flat top.

In some embodiments, the interior space of the lens unit has a curve lateral wall with a gradually enlarging dimension from a bottom peripheral edge of the interior space.

In some embodiments, a spreading light span of the LED chip is above a vertical lateral wall of the interior space.

In some embodiments, a light of the LED chip is reflected from a bottom part of the lens unit upwardly.

In some embodiments, there are bump particles on the bottom part of the lens unit.

In some embodiments, there are concentric convex-concave structures on the bottom part of the lens unit.

In some embodiments, a reflective layer is disposed on the light source plate facing to the lens unit.

In some embodiments, the lens units and the LED chips are divided into multiple module sets.

Each module set is separately coupled to a back cover.

In some embodiments, all lens units are coupled by a plastic plate.

The LED chips are divided into multiple module sets.

Each module set is separately coupled to a back cover.

In some embodiments, the lens units are divided into multiple module set.

All LED chips are mounted on a single light source plate.

The multiple modules are separately coupled to the light source plate.

DETAILED DESCRIPTION

Figure 1:
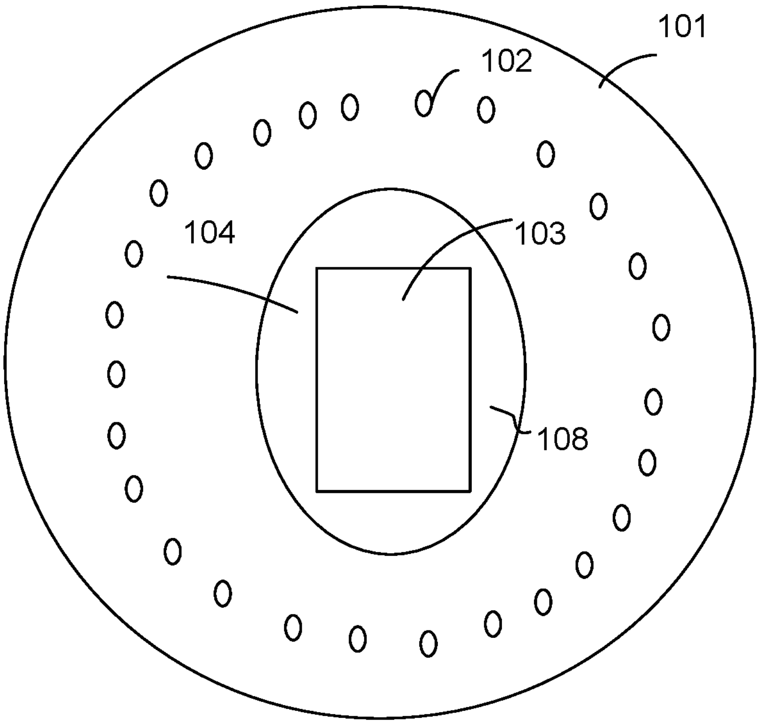
FIG. 1 illustrates a lighting apparatus embodiment.

In FIG. 1, a lighting apparatus includes a light source plate 101, multiple LED modules 102, and a driver module 103. Each LED module 102 includes a lens unit and an associated LED chip.

Figure 2:
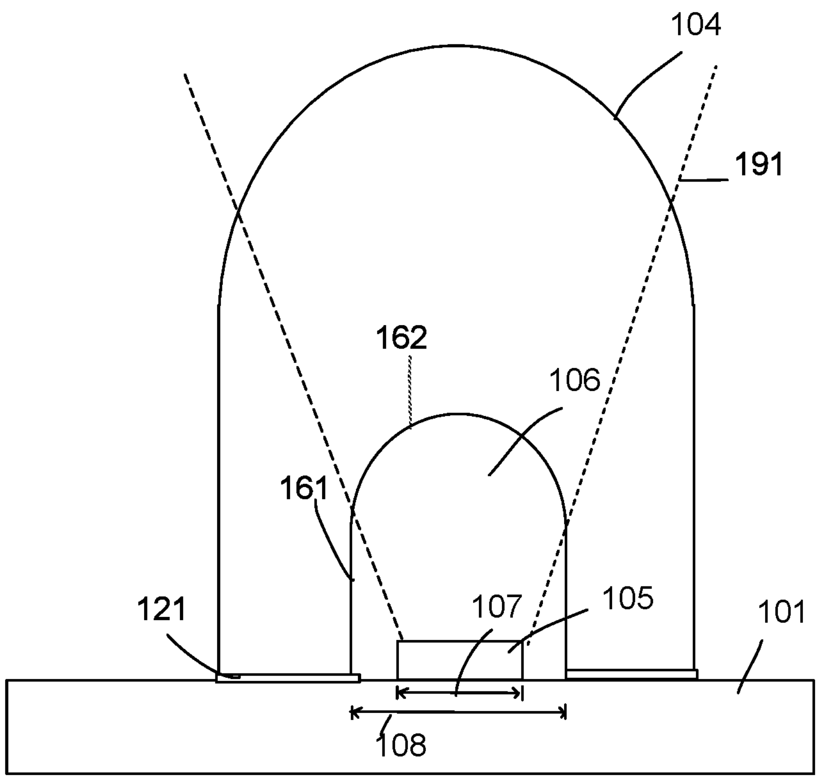
FIG. 2 illustrates a lens unit covering a LED chip example.

FIG. 2 shows an example of such LED module. In FIG. 2, a lens unit 104 is placed above a LED chip 105. The LED chip is mounted on the light source plate 101.

In other words, there are multiple LED chips are mounted on the light source plate. These LED chips may include packages enclosing LED dies covered with corresponding fluorescent layers to generate desired light parameters. There may be multiple types of LED modules disposed on the same light source plate.

In FIG. 1, the driver module 103 is surrounded by the multiple LED chips. The driver module 103 includes power components like transformers, filters and current source circuits, to convert an indoor power source, e.g. 110V AC power, to driving currents supplied to the LED chips. There may be wireless modules coupled to and/or integrated with the power components to receive external commands. Control circuits like controllers, processors or logic circuits may be disposed to receive control commands like translating external commands and/or manual switch, wall switch operations or other settings.

In FIG. 2, the lens unit 104 has an interior space 106 for enclosing one corresponding LED chip 105.

A bottom ratio between a horizontal dimension 107 of the LED chip 105 and a bottom area 108 of the interior space 106 is between 60% to 80%.

In some embodiments, the bottom ratio is preferably between 70% to 80%, considering common LED modules and their spreading light angles while also considering thermal expansion after lots of experiments, which may bring great technical effect.

Figure 3:
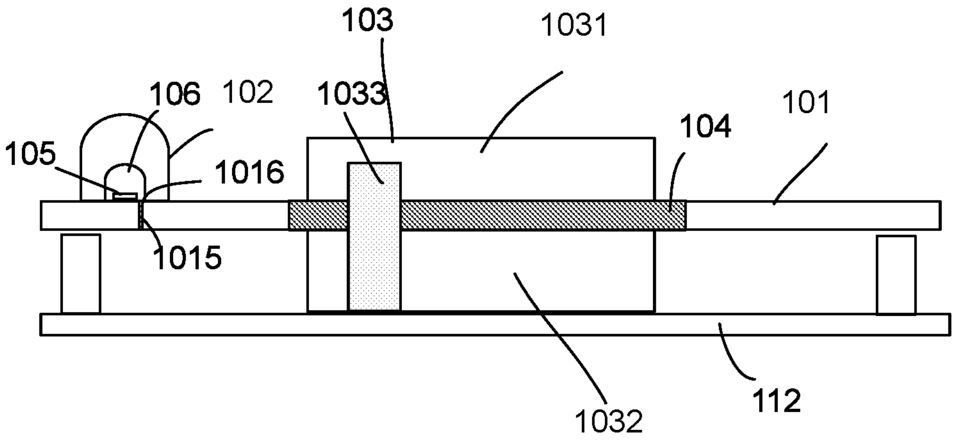
FIG. 3 shows a side view of components in an embodiment.

In FIG. 3, the light source plate 101 has a central opening 104 surrounding the driver module 103, a portion 1031 of the driver module 103 is above the central opening 104, and another portion 1032 of the driver module is below the central opening 104.

FIG. 3 shows a side view of the example in FIG. 1. In FIG. 3, the light source 101 has a top side for placing the LED module 102. There is a horizontal logical surface defined by the central opening 104. For driver components like capacitors 1033 with a larger size, such arrangement helps minimize overall width of the light apparatus.

In FIG. 3, a back cover 112 of the light apparatus is used for attaching the driver module 103. There is a gap between the light source plate 101 and the back cover 112. Therefore there is a remaining space for allocating the driver components that may have a larger size.

In some embodiments, an air passage 1015 of the light source plate 101 corresponding to the LED chip 105 is disposed aside the LED chip 105.

A top opening 1016 of the air passage 1015 is within the interior space.

In FIG. 2, the lens unit 104 is attached to the light source plate 101 with a buffer glue 121 that deforms within a predetermined range under thermal expansion.

For example, the lens unit 104 after hours of heating by the LED chip 105 may increase its size because of thermal expansion. Without the buffer glue 121, which may deform within a desired range, which still reliably attach the lens unit 104 to the light source plate 101 under a stretching force caused by thermal expansion of the lens unit 104.

During experiments, following materials may be used as the buffer glue 121. These glues offer reliable bonding and accommodate the temperature variations that occur in light devices. Here are some commonly used options:

Epoxy Resin offers excellent strength, chemical resistance, and adhesion properties. Epoxy formulations may be adjusted to have a low coefficient of thermal expansion, enabling them to withstand thermal stress and resist deformation.

Silicone Adhesive, based on silicone compounds is found useful effectively while accommodating thermal expansion and contraction. Silicone adhesives also offer good electrical insulation properties.

Acrylic-based adhesives provide high strength, transparency, and resistance to yellowing over time. Some acrylic adhesives are designed to have good thermal stability, allowing them to withstand temperature variations without significant expansion or contraction.

Polyurethane Adhesive is valued for its excellent flexibility, durability, and resistance to impact and vibration. It can handle a wide temperature range, making it suitable for light devices that experience thermal expansion and contraction.

UV Curable Adhesive is a type of adhesive that offers rapid curing when exposed to ultraviolet light. It provides strong bonds with good thermal resistance. UV curable adhesives are often used in light devices because they can be quickly cured without the need for heat, minimizing the risk of heat damage to sensitive components.

Figure 4:
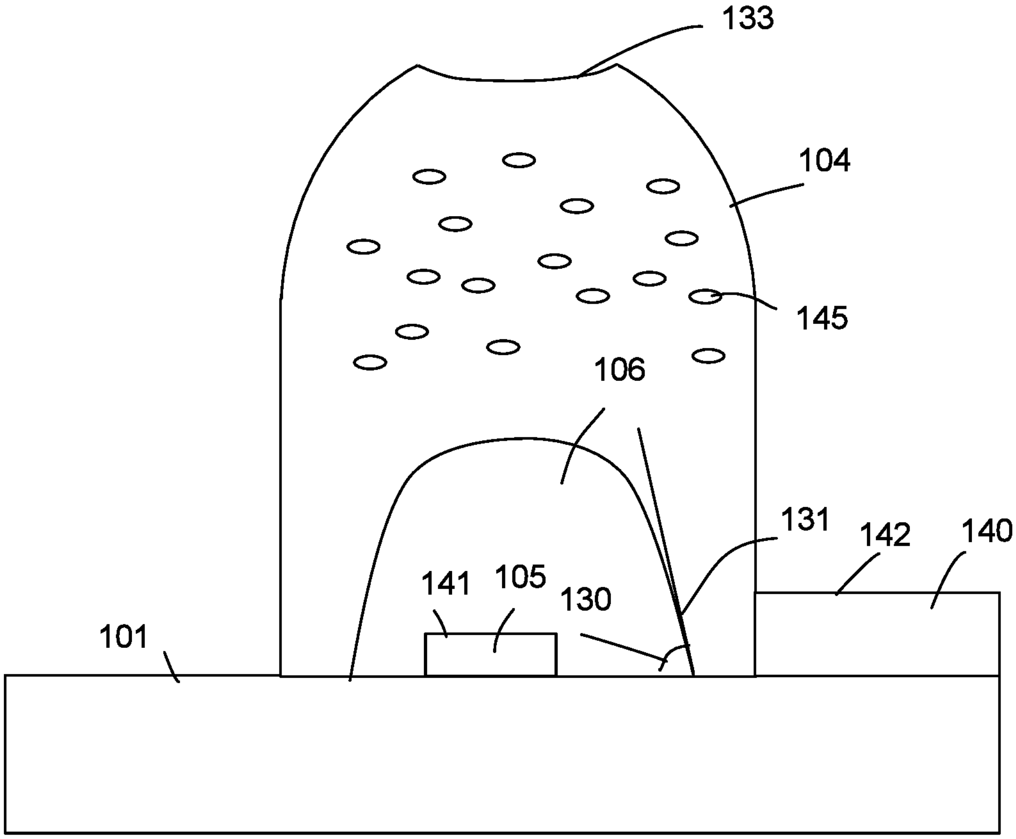
FIG. 4 shows another lens unit example.

In FIG. 4, there is a tilt angle 130 between a bottom peripheral edge 131 of the interior space 106 and the light source plate 101.

The tilt angle 130 is preferably chosen between 70 to 80 degrees to get nice light effect.

In FIG. 4, there is a smooth concave 133 on a top of an exterior surface of the lens unit.

In FIG. 4, the lens units 104 are coupled together with a plastic plate 140. FIG. 1 only show one lens 104. Please refer to FIG. 1, which show multiple LED modules 102. Each LED module 102 has a lens unit and the plastic plate 104 join the multiple lens units together as a module.

In FIG. 4, a top surface 141 of the LED chip 105 is below a top surface 142 of the plastic plate 140. Because there is a spreading angle, which contains most emitted light, such design avoids light energy loss and is found a nice arrangement.

In some embodiments, there are micro particles 145 in the lens unit 104. These micro particles 145 is preferably placed randomly. The diameters of these micro particles 145 is found preferably smaller than 0.1 mm. These particles may be achieved by blending some materials with a plastic material to for the lens unit 104. Air bubbles may also be used during manufacturing the lens unit 104 to form such micro particles.

These particles help smooth emitted lights to make them to change paths in a more random way, thus making the light more smooth.

Figure 5:
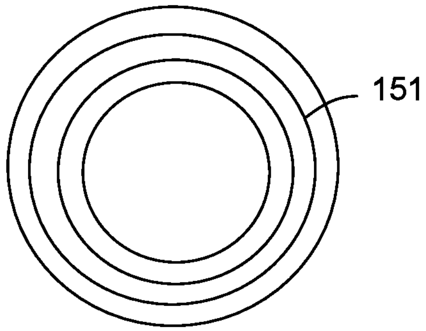
FIG. 5 shows concentric convex-concave structures.

In FIG. 5, there are concentric circle convex-concave structures 151 on a top of an exterior surface of the lens unit.

Figure 6:
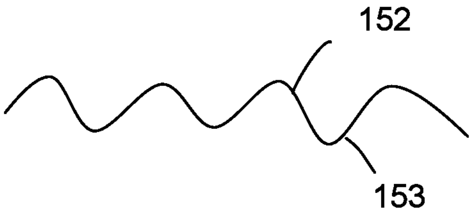
FIG. 6 shows a side view of the example in FIG. 5.

FIG. 6 shows a side view of the enlarged view of these convex-concave structures 151. In FIG. 6, there are convex parts 152 and concave parts 153, which form a convex-concave structures that help change light paths to generate a soft light, preventing undesired light patterns.

In FIG. 2, the interior space 106 of the lens unit 104 has a vertical lateral wall 161 and a dome top 152. The vertical lateral wall 161 is vertical with respect to the light source plate 101.

Figure 7:
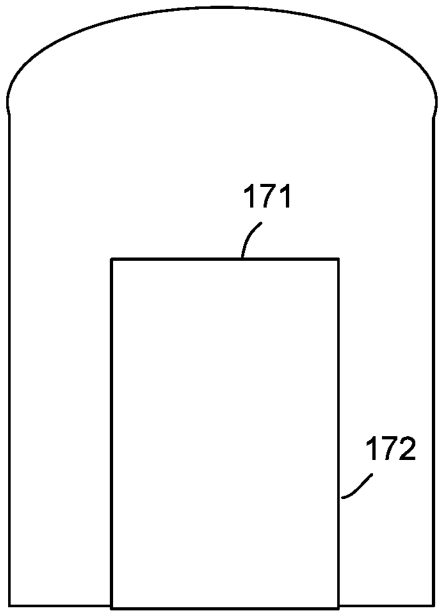
FIG. 7 shows another lens unit example.

In FIG. 7, the interior space of the lens unit has a vertical lateral wall 172 and a flat top 171. Such design provides a nice light pattern effect in some types of embodiments. In addition, such design lowers manufacturing cost.

Figure 8:
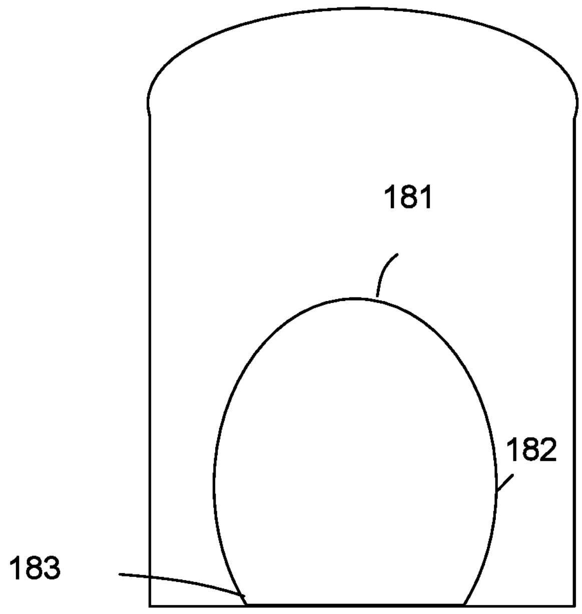
FIG. 8 shows another lens unit example.

In FIG. 8, the interior space of the lens unit has a curve lateral wall 182 with a gradually enlarging dimension from a bottom peripheral edge 183 of the interior space. FIG. 8 shows that the dimension of the interior space is getting larger from the bottom of the interior space. Such design brings another nice light pattern, unlike above embodiments, but provides nice light effect to meet some requirements.

In FIG. 2, a spreading light span 191 of the LED chip is above a vertical lateral wall 161 of the interior space 106.

Specifically, the light emitted by a LED chip 105 is found mostly, e.g. more than 75% of light intensity, within a spreading angle, as shown the spreading light span 191 by the two dashed lines. The dome top 162 starts from a certain point of the lateral wall 161. It is found that the spreading span 191 is preferably found on the dorm top 161, instead of emitting too much light on the vertical lateral wall 161.

In some embodiments, a light 195 of the LED chip is reflected from a bottom part 196 of the lens unit 104 upwardly. In the light path of the light 195 illustrated in FIG. 9, it is emitted upwardly firstly from the LED chip 105. The light 195 is reflected firstly by the surface of the lens unit 104, which may be caused by undesired surface, and reflects upwardly by the bottom part 196 of the lens unit 104. With such design, more effective lights are guided to useful directions, increasing light efficiency.

Figure 9:
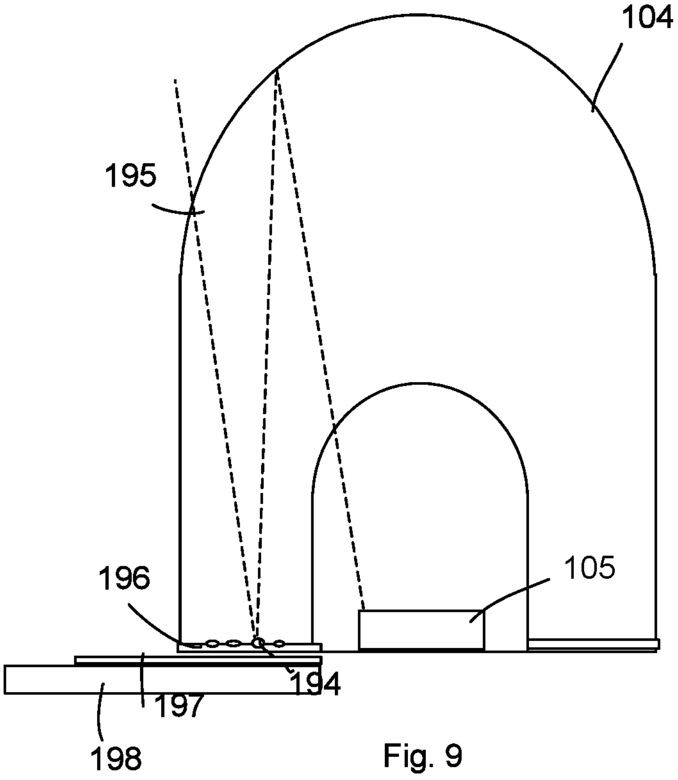
FIG. 9 shows how light reflects from the bottom side of the lens unit.

In FIG. 9, there are bump particles 194 on the bottom part of the lens unit.

In some embodiments, there are concentric convex-concave structures on the bottom part of the lens unit, similar to the structures mentioned above and illustrated in FIG. 5 and FIG. 6.

In FIG. 9, a reflective layer 197 is disposed on the light source plate 198 facing to the lens unit 104.

Figure 10:
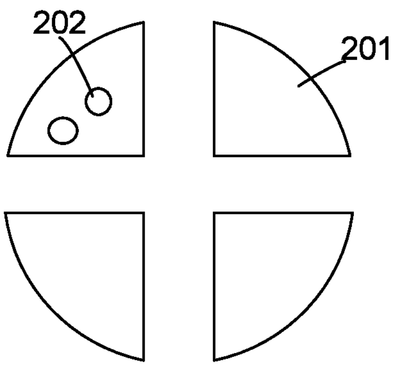
FIG. 10 shows an arrangement of module sets.

In some embodiments, the lens units and the LED chips are divided into multiple module sets. FIG. 10 shows that the lens units and the LED chips are divided into four module sets 201. Each module set include LED module 202. Each LED module 202 includes a lens unit and a LED chip.

Each module set is separately coupled to a back cover. For example, the four module sets are separately attached to a back cover 112 as illustrated in FIG. 3.

In some embodiments, all lens units are coupled by a plastic plate 140, as illustrated in FIG. 4.

In such case, the LED chips are divided into multiple module sets. Each module set is separately coupled to a back cover.

In some embodiments, the lens units are divided into multiple module set. All LED chips are mounted on a single light source plate.

The multiple modules are separately coupled to the light source plate.

In other words, three different designs are provided here for different needs. In first case, all LED chips are mounted on a single light source plate. Then the lens units are divided into three, four or five module sets. These module sets are attached to the light source plate separately. By doing this, the overall lens module with plastic plate is not that large, making it easier to align the lens unit with the LED chip.

In the second case, the light source plate is divided into multiple units each holding multiple LED chips. In the second case, the lens modules are also divided into same sets corresponding to each part of the light source plate.

In the third case, unlike the second case, the lens units are all integrated with plastic plate to be a single module placed above multiple parts of light source plates.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a light source plate;

multiple LED chips mounted on the light source plate;

a driver module surrounded by the multiple LED chips; and multiple lens units, wherein each lens unit has an interior space for enclosing one corresponding LED chip, wherein a bottom ratio between a horizontal dimension of the LED chip and a bottom area of the interior space is between 60% to 80%, wherein an air passage of the light source plate corresponding to the LED chip is disposed aside the LED chip, wherein a top opening of the air passage is within the interior space.

2. The lighting apparatus of claim 1, wherein the light source plate has a central opening surrounding the driver module, a portion of the driver module is above the central opening, and another portion of the driver module is below the central opening.

3. The lighting apparatus of claim 1, wherein there is a tilt angle between a bottom peripheral edge of the interior space and the light source plate, wherein the tilt angle is between 70 to 80 degrees.

4. The lighting apparatus of claim 1, wherein there is a smooth concave on a top of an exterior surface of the lens unit.

5. The lighting apparatus of claim 1, wherein the lens units are coupled together with a plastic plate, wherein a top surface of the LED chip is below a top surface of the plastic plate.

6. The lighting apparatus of claim 1, wherein there are micro particles in the lens unit.

7. The lighting apparatus of claim 1, wherein there are concentric circle convex-concave structures on a top of an exterior surface of the lens unit.

8. The lighting apparatus of claim 1, wherein the interior space of the lens unit has a vertical lateral wall and a dome top.

9. The lighting apparatus of claim 1, wherein the interior space of the lens unit has a vertical lateral wall and a flat top.

10. The lighting apparatus of claim 1, wherein the interior space of the lens unit has a curve lateral wall with a gradually enlarging dimension from a bottom peripheral edge of the interior space.

11. The lighting apparatus of claim 1, wherein a light of the LED chip is reflected from a bottom part of the lens unit upwardly.

12. The lighting apparatus of claim 11, wherein there are concentric convex-concave structures on the bottom part of the lens unit.

13. The lighting apparatus of claim 11, wherein a reflective layer is disposed on the light source plate facing to the lens unit.

14. The lighting apparatus of claim 1, wherein the lens units and the LED chips are divided into multiple module sets, wherein each module set is separately coupled to a back cover.

15. The lighting apparatus of claim 1, wherein all lens units are coupled by a plastic plate, wherein the LED chips are divided into multiple module sets, wherein each module set is separately coupled to a back cover.

16. The lighting apparatus of claim 1, wherein the lens units are divided into multiple module set, wherein all LED chips are mounted on a single light source plate, wherein the multiple modules are separately coupled to the light source plate.

17. The lighting apparatus of claim 1, wherein the lens unit is attached to the light source plate with a buffer glue that deforms within a predetermined range under thermal expansion.

* * * * *